United States Patent [19]

Huetter

[11] 4,201,514
[45] May 6, 1980

[54] WIND TURBINE

[76] Inventor: Ulrich Huetter, Schlierbacher Strasse 93, D-7312 Kirchheim, Fed. Rep. of Germany

[21] Appl. No.: 857,277

[22] Filed: Dec. 5, 1977

[30] Foreign Application Priority Data

Dec. 4, 1976 [DE] Fed. Rep. of Germany ....... 2655026

[51] Int. Cl.$^2$ ............................................. F03D 7/04
[52] U.S. Cl. ..................................... 416/37; 416/102; 416/132 B
[58] Field of Search .............. 416/37.41, DIG. 4, 135, 416/133, 104, 102, 148, 9, 31, 114, 139 A, 132 B

[56] References Cited

U.S. PATENT DOCUMENTS

| 2,360,791 | 10/1944 | Putnam | 416/37 |
|---|---|---|---|
| 2,484,291 | 10/1949 | Hays | 416/11 X |
| 2,832,895 | 4/1958 | Hutter | 416/41 X |
| 4,083,651 | 4/1978 | Cheney et al. | 416/18 |
| 4,084,921 | 4/1978 | Norz | 416/17 |

FOREIGN PATENT DOCUMENTS

| 1121478 | 1/1962 | Fed. Rep. of Germany | 416/140 |
|---|---|---|---|
| 1032358 | 7/1953 | France | 416/41 |
| 2291378 | 6/1976 | France | 416/140 |
| 2300233 | 10/1976 | France | 416/141 |
| 40533 | 12/1957 | Poland | 416/41 |

OTHER PUBLICATIONS

Machine Design; vol. 48; No. 12, May 20, 1976.

*Primary Examiner*—Everette A. Powell, Jr.
*Attorney, Agent, or Firm*—Ostrolenk, Faber, Gerb & Soffen

[57] ABSTRACT

A wind turbine having a wing rotor with two rotor blades supported on a hub; to accommodate different wind velocities nearer and further from the ground and to accommodate the components of wind force transverse to the rotor blade plane of rotation, the pitch of the blade that is then higher above the ground is altered with respect to the pitch of the blade that is nearer to the ground; this can be done by appropriate swivel mounting of the rotor hub for allowing its reorientation to change the effective pitch of the blades as they rotate high and low; or it can be done by a blade swiveling means sensitive to wind conditions.

36 Claims, 12 Drawing Figures

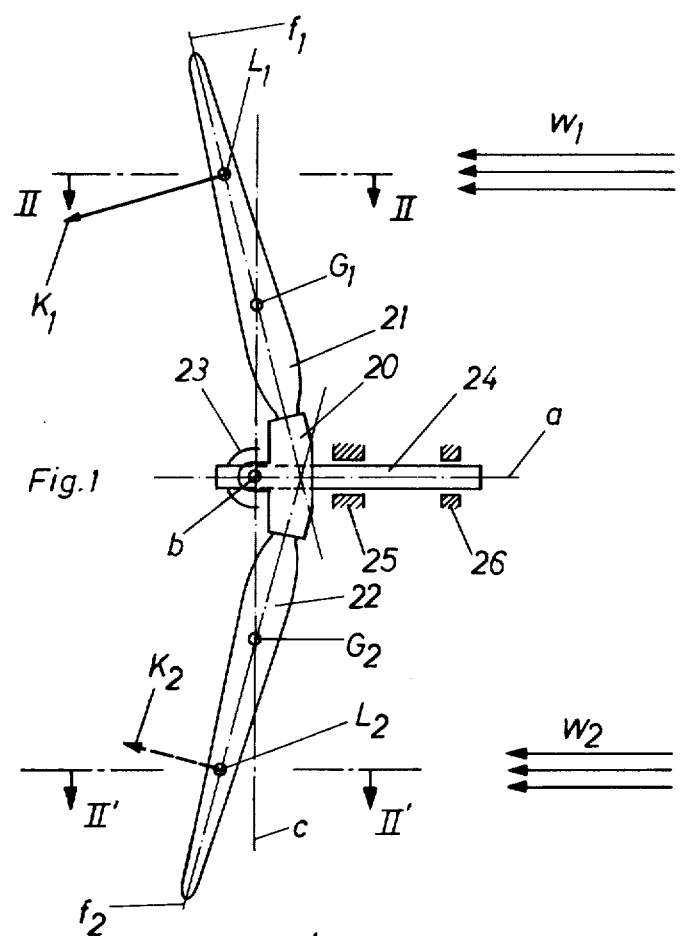
Fig. 1
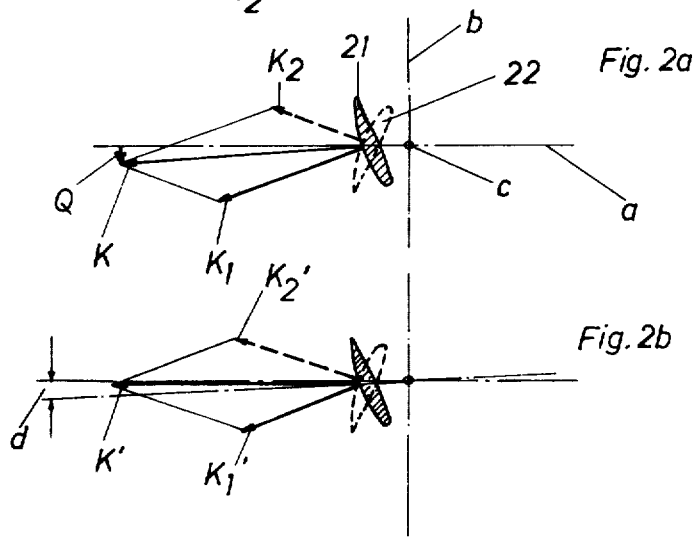
Fig. 2a
Fig. 2b

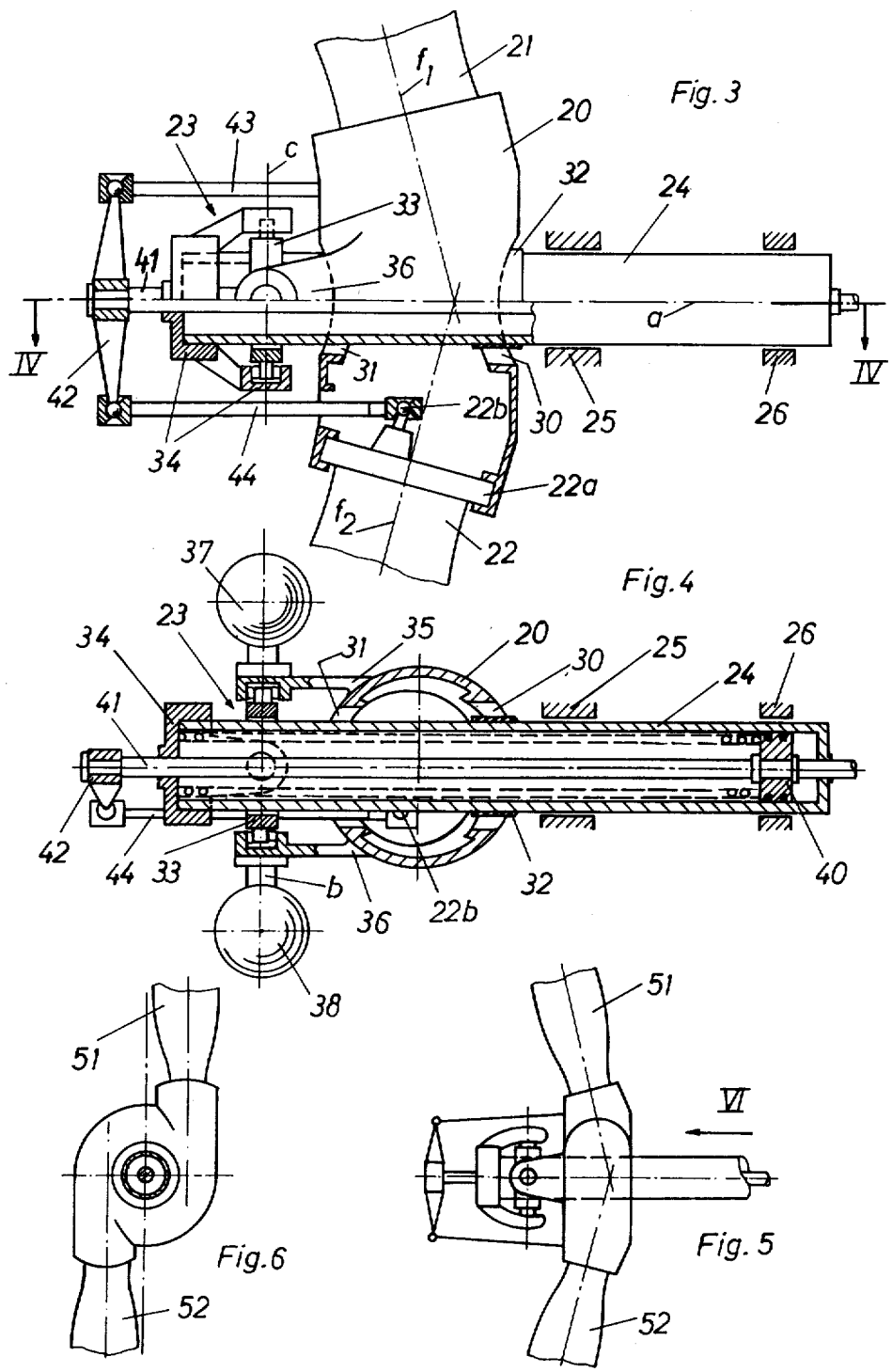

WIND TURBINE

The invention relates to a wind turbine, which is also referred to as a wind energy converter or a wind power machine.

BACKGROUND OF THE INVENTION

The wing rotors of wind turbines may be equipped with only a single wing blade having a corresponding counter balancing mass. Preferably, however, two wing blades are provided. But also rotors having three or more wing blades may be used.

Unless special measures are taken to ensure their smooth running, wind turbines run erratically due to different air flow speeds impinging on the turbine rotor in the region of the rotor plane of revolution. These speed differences predominantly result from the fact that wind velocity is inhibited near the ground friction boundary layer and it increases above the ground. In this case, the statistical mean values of air flow velocity in the upper region of the rotor plane of revolution can exceed those values in the lower region by such an amount that the aerodynamic forces against a wing blade during one rotor revolution can fluctuate upwardly or downwardly by more than 20%. Such cyclic force fluctuations are particularly dangerous because the cycle speed may be at the characteristic resonant frequencies of individual components, e.g., at the characteristic resonant frequencies of the wing blades or of the tower on which the wind turbine is permanently based. Under certain conditions, therefore, the durability limit of the components under load can be reached. Additionally, under gusty wind conditions, overloads can occur. These, too, can adversely affect single wing blades. Frequently, a sudden increase in wind velocity puts a load on the rotor during only part of its revolution.

In a known wind turbine shown in U.S. Pat. No. 2,360,791, an attempt has been made to damp the oscillations produced by the above phenomena. Each wing blade is individually coupled with the rotor hub by a respective link. The axis of each link is placed perpendicular to the rotational axis of the hub. A shock absorber equipped lever system allows for limited swiveling motion of the wing blades. A severe drawback of this design is that both mass unbalanced and aerodynamic unbalanced effects are produced by an unequal amount of individual wing blade deflections.

In another known wind turbine (described in Lueger: Lexikon der Technik (Engineering Encyclopedia), 1965, Vol. 7, pp. 574–581), the wing blades are rotatable around their longitudinal axes, in contrast to the above described design, but are otherwise rigidly supported in the rotor hub. To improve their smooth running in this case, a pivotable connection is provided between the rotor hub and the rotor shaft. The articulated axle of the pivotable connection is arranged perpendicular to the plane determined by both wing axes, namely so that the articulated axle intersects the rotor rotational axis at the center of gravity of the wing rotor (the latter consisting of the rotor hub and both wing blades). With this design, the wing rotor always swivels as a whole around its center of gravity, so that the mass unbalance is eliminated. In other respects, this known design operates as follows. If different aerodynamic forces engage the wing blades, then the pitching moment that is the resultant of the differential between the axial components of the aerodynamic forces triggers a swiveling motion of the rotor around its articulated axle. But, this pitching moment is constantly compensated for by the centrifugal forces constantly acting on both wings, as a function of the rotor rpm. The centrifugal forces produce a restoring moment that counteracts the above described pitching moment following each swiveling drift of the rotor from its standard position.

For rotor rpm control, there is a wing timing device, which preferably has a centrally placed setting rod connected to the wing blades via two control levers. Upon swiveling of the rotor around its articulated axle, the setting rod retains its position, so that the wing blades are timed, meaning in this context that the angle of attack of the higher wind flow velocity affected wing blade is relatively reduced while the angle of attack of the other wing blade is correspondingly increased. In this case, the coupling of both rotational motions, namely the swiveling motion of the wing rotor around its articulated axle and the rotational motion of each wing blade around its own longitudinal axis, is a motion that is mechanically identical to a swiveling motion of both wing blades around an axis. The latter axis is inclined at an angle to the above noted articulated axle which angle is determined by the rotating vector resultant from the swivel motion of the rotor and the turning of the wing blade. Through this measure, namely the coupling between swivel motion and wing blade rotation, a matching of wing blade engaging differential-tangential aerodynamic forces could be accomplished, but only under certain fixed operating conditions. With large-scale installations, there is an added complication that the disturbing force resultant from a residual differential between tangential aerodynamic forces is so large and the specific stiffnesses of loaded components are so negligible because of their large dimensions that there is still the danger of triggering coupled wing blade and/or tower oscillations even on relatively minor irregularities.

SUMMARY OF THE INVENTION

The object of the invention is to improve the above described wind turbines or wind energy converters to considerably further reduce the erratic running resulting from differential wind velocities across the plane of rotation of the rotor. The invention seeks an optimally smooth run under any possible operating conditions.

The invention utilizes the fact that from the differential between wing engaging tangential aerodynamic forces, a power component results, which component engages the blade rotor at least approximately across the wind direction. That component will hereafter be designated as the transverse force. In any given case, there also are other forces that act upon the wing rotor across the wind direction. In every case, the transverse force is the resultant of all forces acting upon the wing rotor across the wind direction.

The invention uses the transverse force as a trigger pulse for a cyclic change in the wing blade angles of attack. The transverse force is particularly suitable for this purpose because, under conditions of preset wind velocity distribution, the amount of transverse force cyclically changes according to the rotor rpm. A further fact used in the invention is that the direction of maximum transverse force is a function of the direction of the drop in wind velocity across the rotation plane of the rotor.

A number of embodiments of the invention are proposed herein. They operate according to the following characteristic features.

In some arrangements, the wing rotor is connected to the rotor shaft by an articulated joint coupling, which allows for angular displacement of the rotor hub axis in any direction without any wing rotor axial shift. Several universal joints are suitable for this purpose. A preferred joint is a Cardan joint. This is preferred because the articulated joint coupling simultaneously is supposed to transmit the weight of the entire wing rotor to the rotor shaft. The effect of the use of a universal joint means is explained in the detailed description below. A two-blade wing rotor, like the above described Lueger wind turbine, reacts to a differential axial aerodynamic forces by an evading motion around an axis that is perpendicular to the plane determined by both wing axes, and that intersects the rotor axis at the rotor center of gravity.

Additionally, the universal joint allows for a transitory swiveling motion of the wing rotor under the effect of the transverse force. Such swiveling of the wing rotor, under subsequently described conditions, effects such a change in blade angles of attack that the differential of aerodynamic force tangential components acting upon the blades and in that way the resultant transverse force disappears or at least can be considerably reduced.

For simplicity, the following explanation refers to a two-blade rotor. The prerequisites for a universal joint having the above described effect are now described.

(a) The blade longitudinal axes are inclined with respect to the rotational plane and in the wind flow direction. Until now, this known measure was taken for the sole purpose of at least partially recompensating the bending moment aerodynamically acting on each blade by a counter-bending moment resulting from mass centrifugal forces.

(b) For each blade, the distance between the assumed point of impact of the resultant from all aerodynamic forces on the one hand, and the rotor shaft axis, on the other hand, is larger than the distance of the mass center (blade center of gravity) from the rotor shaft axis.

When both prerequisites are met, the transverse force effects a swiveling motion of the wing rotor around an axis named "high axis". This axis is at least approximately parallel with a line interconnecting both blade tips. As a result, the angle of attack or pitch of the blade that is assailed by higher flow velocity wind is reduced while the pitch of the other blade is increased. According to the invention, this effect is produced directly by swiveling of the wing rotor around the high axis, without any assistance from guide rods and without any swiveling of the blades in their own bearings at their hubs (around their own longitudinal axes). In this way, a clear separation is made between the timing action for smooth-run improvement on the one hand and the timing actions for output-and thrust regulation and, if required, start booster action on the other hand.

The described effect then can be produced even if the blades are mounted rigidly and that way nonrotatably in the rotor hub if only the blade tips are arranged rotatably relative to the main parts of the blades. In practice, however, with all modern designs, the blades are rotatable as a whole for the purpose of rpm control and they are each connected to a central setting rod via a guide rod. But for purposes of the invention, this is not undesirable and may even be helpful. On swiveling of the rotor hub around the high axis, the guide rods in certain cases effect a more or less emphasized swiveling of the blades with respect to the hub. The extent of this swiveling can be varied by a proper arrangement of guide rod linkage points on the guiding rod support so that the effect of the changing blade pitch through swiveling around the high axis in the desired sense is amplified or damped or not changed at all. A particularly profitable way is to amplify the effect in connection with the following aspect.

As a consequence of the swiveling of the wing rotor around its high axis, a mass-force deviation moment appears. This counters the torque produced by the transverse force (which is an aerodynamic force), and it has the tendency to swivel the wing rotor back into its initial position. To amplify this mass-force deviation moment, booster masses can be placed on the wing rotor. But because of the amplification of pitch changing effects by the wing rotor swiveling motions, relatively small booster masses may be sufficient or they may even be omitted altogether.

For easier understanding, the different swiveling motions of the wing rotor around both cardan joint swiveling axes have been explained separately. Actually, both swiveling motions take place simultaneously and overlap each other.

In other embodiments of the invention, the transverse force is constantly measured, and the timing of the blades by means of guide rods is ensured by a suitable control device, namely as a function of the magnitude and in any given case the direction and/or phase relation of the transverse force. The control device also assures that the transverse force remains at least approximately at zero or that it fluctuates about zero to only a minimal degree.

BRIEF DESCRIPTION OF THE DRAWINGS

Other objects and features of the invention are apparent from the following description of embodiments of the invention, viewed in conjunction with the drawings, in which:

FIG. 1 shows a schematized view of a first embodiment of a two-blade rotor for a wind turbine;

FIGS. 2a and 2b schematically illustrate the aerodynamic force resultant of the air flow acting upon the rotor blades as viewed in cross-section at II—II and II'—II' in FIG. 1, respectively;

FIG. 3 is a partially cross-sectioned, longitudinal view of the wing rotor of a wind turbine schematically shown in FIG. 1;

FIG. 4 is a longitudinal cross-sectional view along line IV—IV of FIG. 3;

FIG. 5 is a fragmentary longitudinal view of a second embodiment of a wing rotor that has been modified from the embodiment of FIG. 3;

FIG. 6 is an end view in the direction of arrow VI of FIG. 5;

DESCRIPTION OF THE PREFERRED EMBODIMENTS

Figure 7:
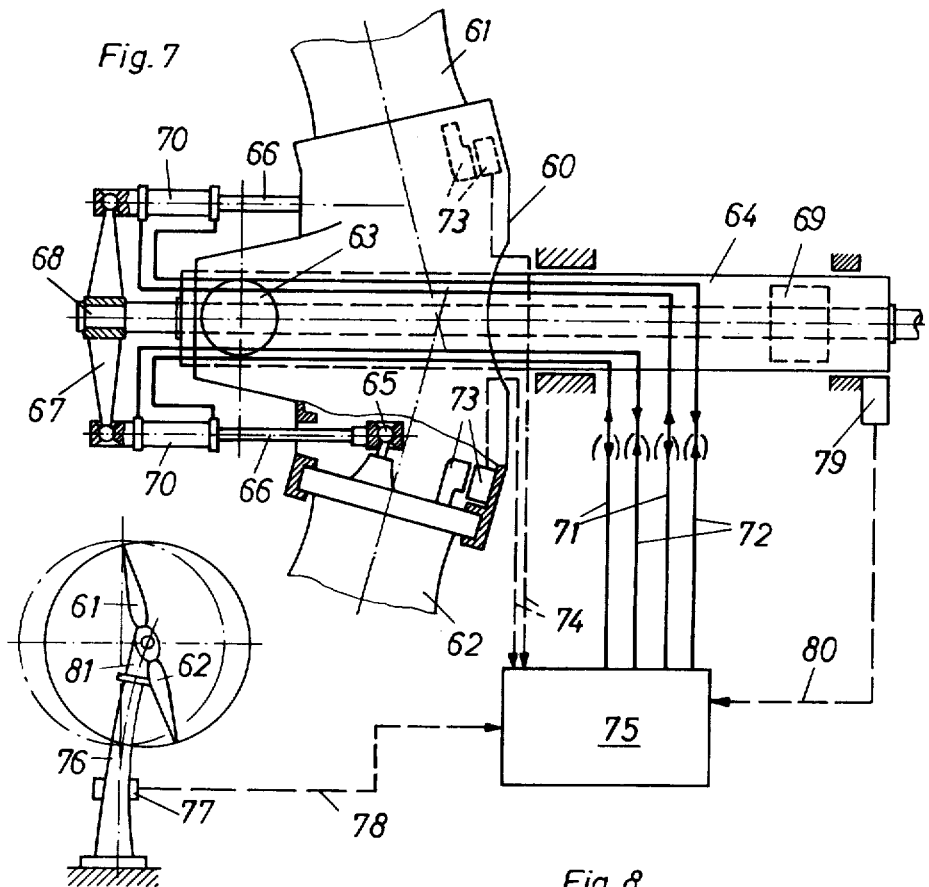
FIG. 7 is a partially schematic longitudinal view of a third embodiment of a wing rotor, with wing timing for countering the transverse force being achieved through a control device.

The wing rotor of the first embodiment of a wind turbine shown in FIG. 1 comprises a rotor hub 20 and two wing blades 21 and 22 supported on the hub. The rotor hub 20 is swivelably connected to a rotor shaft 24 via a cross-pin or cardan joint 23 (shown in more detail in FIG. 3). The shaft 24 is supported for rotation in bearings 25 and 26. These bearings are supported by a bearing seat (not shown), and the bearing seat is rotatable around an axis that is at least approximately perpendicular, for enabling the wing rotor to turn into the oncoming wind. That axis for the bearing seat would be through the upstanding tower (of the type, for example, shown in FIG. 7) on which the bearing seat is carried. Elements (not shown) transmit rotational energy from the rotor shaft 24 to a generator or directly to an engine drive.

The rotor shaft 24 revolves around longitudinal axis a. Both wing blades 21 and 22 are supported for swiveling with respect to hub 20 under a torque force around their respective longitudinal axis $f_1$ and $f_2$. Such swiveling adjusts the pitches of blades 21 and 22 with respect to hub 20 and shaft 24. The longitudinal axes $f_1$ and $f_2$ are inclined to tilt away from the oncoming wind and are tilted relative to a rotational plane that is perpendicular to the rotor axis a. The wind is blowing along the paths designated by arrows $w_1$ and $w_2$. The difference in arrow lengths between arrows $w_1$ and $w_2$ implies that the wind velocity in the upper regions of the rotor plane of revolution is higher than in the lower regions of that plane.

The cardan joint 23 has a first swiveling axis b that is perpendicular to the wing blade axes $f_1$ and $f_2$. The joint 23 also has a second swiveling axis c, called the high axis, which is perpendicular to axis b and which passes through both centers of gravity $G_1$ and $G_2$ of the respective wing blades 21 and 22. Both swiveling axes b and c are intersected by the rotor shaft axis a at the center of gravity of the entire wing rotor. All three axes are mutually perpendicular.

Referring to FIGS. 1 and 2a, the aerodynamic forces acting on each wing blade 21, 22 are assumed to collectively respectively result in aerodynamic forces $K_1$ and $K_2$. The respective impact points of these aerodynamic forces are assumed to be $L_1$ and $L_2$. Note that impact points $L_1$ and $L_2$ are further from joints 23 than the respective wing blade centers of gravity $G_1$ and $G_2$. This enables the wind force at points $L_1$ and $L_2$ to cause the rotor 20, 21, 22 to swivel appropriately about the high axis.

In FIGS. 1 and 2a the resultant aerodynamic forces $K_1$ and $K_2$ on both wing blades are drawn in according to the magnitude and direction that would be produced with the wing blades rotated to be then at their approximately vertical orientation and wherein ring rotor 20, 21, 22 is not deflected around its swiveling axes b and c. Evidently, $K_1$ is larger than $K_2$, both in the component of force in the direction of rotor shaft axis a and in the component of force that is perpendicular and is directed radially outward. FIG. 2a shows the resultant K of both aerodynamic forces $K_1$ and $K_2$. The power component of both forces, named "transverse force", acts across the wind direction and is designated as Q.

As described above, the prior art Lueger wind turbine permits the wing rotor to deflect only around a swiveling axis like axis b in FIG. 1 herein. Although this balances out the differential between the axial components along axis a of the aerodynamic force $K_1$ and $K_2$, differential between the $K_1$ and $K_2$-peripheral or outward components of force, which equals the transverse force Q, can be reduced only to a certain degree.

According to the invention, on the other hand, the wing rotor may also deflect in a lateral direction under the effect of the transverse force. In the case of an embodiment equipped with the cardan joint 23, as shown in FIG. 2, the lateral deflection consists of swiveling of wing rotor 20, 21, 22 around the high axis c through the angle d in FIG. 2b. The effect of such a swiveling motion is shown in FIG. 2b. Both resultant aerodynamic forces, now designated as $K_1'$ and $K_2'$, have become approximately identical. Specifically, their peripheral or outward components of force are equal so that the transverse force Q of FIG. 2a has disappeared.

As has been explained above, swiveling of the wing rotor around the high axis c changes the pitches of blades 21 and 22 relative to the rotor axis a and produces a mass-force deviation moment, which counters the torque produced by the transverse force Q relative to the high axis c. Under actual conditions which differ from the theoretical showing of FIG. 2b, the transverse force Q will never completely disappear. Proper dimensioning of the wing rotor and, if required, of booster masses 37, 38 in FIG. 4, however, can insure that upon swiveling of the wing rotor around high axis c, the gradual reduction of the transverse force Q-produced moment is accelerated as the deviation moment increases. In this way, a state of equilibrium between both moments is reached only after the transverse force Q has been relatively minimized.

FIGS. 3 and 4 detail the structure of the wing rotor that is schematically shown in FIG. 1. Both wing blades 21 and 22 are supported in the rotor hub 20 by respective end flanges 22a. Each blade is also equipped in a conventional way with a control pin 22b that is eccentric to the respective longitudinal axis $f_1$ or $f_2$.

The tubular rotor shaft 24 which is supported by bearings 25 and 26 passes through hub 20. The hub has sufficiently wide entrance openings 30 and 31 for this purpose. Within specified limits, the hub 20 can be swiveled around the center of cardan or cross-pin joint 23 in all directions. The internal edge in hub 20 defining opening 30 serves to limit the swiveling motions of hub 20 by the impact of the edge of opening 30 against rotor shaft 24. At the impact area, shaft 24 is equipped with an elastic limit, annular stop ring 32.

The cardan or cross-pin joint 23 comprises a pin supporting collar 33, which encircles the rotor shaft 24 with wide play. Four equally spaced apart, radially outwardly projecting pins are arrayed around collar 33. On two of these pins a fork-type joint 34 (FIG. 3) is carried. Joint 34 is rigidly connected to the rotor shaft 24. The rotor hub 20 is carried by two articulated arms 35 and 36 that are connected to the two other pins (FIG. 4). To amplify the above described deviation moment, booster masses 37 and 38 can be attached to the ends of the articulated arms 35 and 36.

The axis of the pins associated with articulated arms 35, 36 of rotor hub 20 is the swiveling axis b. The axis of the other two pins associated with hub 20 is the swiveling high axis c. This axis arrangement, however, has no bearing on the effectiveness of the cardan joint 23. The pin axes, viewed in the direction of rotor axis a, can assume any position relative to the planes of the wing axes $f_1$, $f_2$. This is because the mutually perpendicular array of pins at the joint together enable the rotor to swivel in any direction off axis a. The illustrated arrangement is the preferred one, as is one in which the pin axes are rotated by 90° relative to the illustrated position.

A further optional variant from the illustrated first embodiment is for the rotor shaft 24 to be attached from the left side in FIG. 3 to the cardan joint 23. In this case, the shaft 24 does not pass through the hub 20.

To time the wing blades 21 and 22, i.e. to provide a substantially uniform rotor speed despite wind speed and transverse force variations, the rotor shaft 24 is in the form of a cylinder for a control piston 40. The piston rod or control rod 41 which passes inside the shaft 24 and is attached to piston 41, in the region of the crosspin joint 23, is guided in the covering flange 34 of the fork-type joint. Beyond the flange 34, the piston rod 41 carries a double arm guide rod support 42. The ends of the arms of this double arm guide rod support 42 are connected to the control pins 22b of the wing blades 21 and 22 through the respective guide rods 43 and 44. As the various aerodynamic forces on the wing blades 21 and 22 vary, their pitches should be varied to time the rotor and achieve a substantially uniform speed of rotation. Piston 41 is controlled for shifting axially by conventional pressure media means and this swivels the blades 21 and 22 through pins 22b around the blade axes $f_1$ and $f_2$, so as to adjust blade pitch.

The second illustrated embodiment shown in FIGS. 5 and 6 substantially differs from the first embodiment only in the respect that both wing blades 51 and 52, as viewed along the direction of extension of the rotor swiveling axis a (FIG. 6), are both identically offset from a central plane through the axis. Through this arrangement, the booster masses 37 and 38 of FIG. 4 can be omitted.

The third illustrated embodiment shown in FIG. 7 includes a rotor hub 60 and two wing blades 61 and 62. But, here the rotor hub is connected to the rotor shaft 64 only by a simple single axis swivel joint 63. Thus, from the basic structural point of view, this embodiment corresponds to the prior art Lueger design.

Each wing blade has a control pin 65, which is connected to the double arm guide rod support 67 via a respective guide rod 66. The support 67 is carried on the central control rod 68. The hollow rotor shaft 64 again forms the cylinder for the control rod 68, which supports the piston 69. The piston 69 is conventionally loaded by pressure media for wing blade timing purposes.

Deviating from the prior art Lueger design, both guide rods 66 in FIG. 7 are developed as piston rods for the hydraulic operating cylinders 70. The relative length of guide rods 66 can be varied. Aside from the common timing of both wing blades 61 and 62 by means of the central piston 69 (primarily for rpm control purposes), additional individual timing of wing blades can be effected through adjustable guide rods 66. This individual timing of the wing blades can be so controlled by means of a control device 75 in order that the transverse force (Q in FIG. 2a) can be minimized.

The control device can also receive a measurement, e.g., as shown in FIG. 7, of the elastic deformation of the tower 76 on which the wind turbine is arranged, which deformation is caused by the transverse force.

The sensing device 77 senses the deformation. Device 77 is connected to control device 75 via a test line 78. The sensing device 77 may be comprised of three peripherally distributed wire strain gauges.

It is apparent that the deformation of the tower 76 and accordingly also the lateral deflection of the wing rotor together with the bearing seat 81 have been exaggerated in FIG. 7 for explanatory purposes.

Another test device 79 communicates with control device 75 via line 80 to indicate the applicable position, i.e. the angle of rotation of rotor shaft 64. Finally, two position indicators 73 are provided in rotor hub 60, for indicating the momentary pitch of both wing blades. This signal is sent via lines 74 to control device 75. For actuating both hydraulic cylinders 70 from control device 75, two respective pressure media lines 71 and 72 are provided.

Control device 75 is developed so that on the basis of data inputs during rotation of wing rotor 60, 61, it cyclically varies the hydraulic pressure in lines 71 and 72 and in that way it varies the current pitch of the wing blades so that, in effect, as in FIG. 2b the peripheral or outward components of the aerodynamic forces acting upon the wing blades are at least approximately equalized. As a result, the transverse force Q disappears or, at least, is prevented from producing any further disturbing effects. Because there are two cylinders 70 and each is controlled by its line 71, 72, the pitches of blades 61 and 62 can be respectively different from one another and can be unique as the particular aerodynamic forces make necessary.

Figure 8:
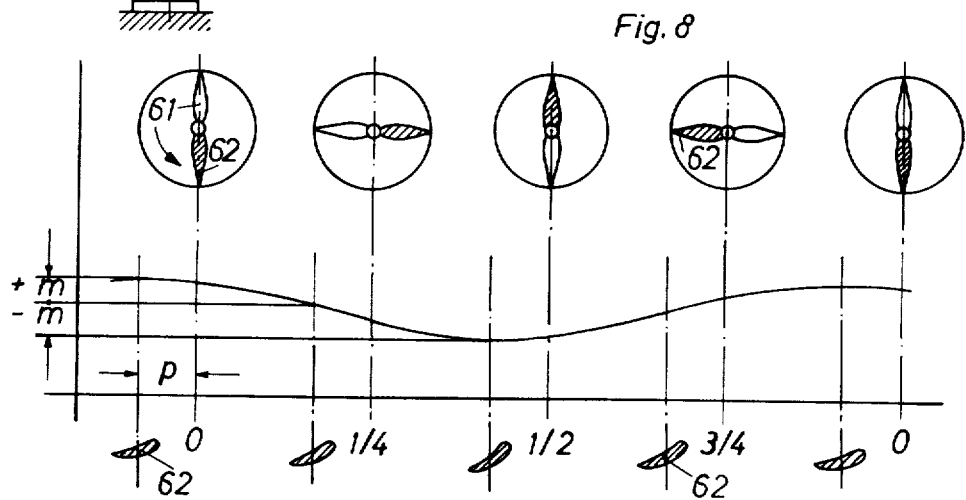
FIG. 8 diagrammatically explains the cyclic rotation of the rotor blades of the wing rotor according to FIG. 7.

FIG. 8 diagrammatically shows the sinusoidal characteristic of one cycle of the cyclically timed wing blade 62. In the illustrated case, the wing blade pitch fluctuates around an initial mean value with the maximum amplitudes of fluctuation being between $+m$ and $-m$. Both amplitudes can absolutely differ from each other. The extreme pitch values of wing blade 62 can be associated with the vertical positions of the wing rotor at the "0" position. But there may alternatively be a phase shift in the fluctuations, as shown in FIG. 8, by the cycle distance p so that the extreme pitch values of the blade 62 may be offset from the vertical position of the rotor. The phase shift can be automatically preset by control device 75.

In a variant of the embodiment of FIG. 7, instead of the rigid connection of guide rod support 67 to control rod 68 and instead of providing both hydraulic cylinders 70, the following can be provided. The control rod 68 can be equipped at its left outer end with a simple joint at which a yoke-like guide rod support is swivelably attached. In this case, the required swiveling angle of the guide rod support can be determined by a single hydraulic cylinder, which also is controlled by a regulator device. In this arrangement, the pitch of both wing blades is always changed in a common but identical way.

Figure 9:
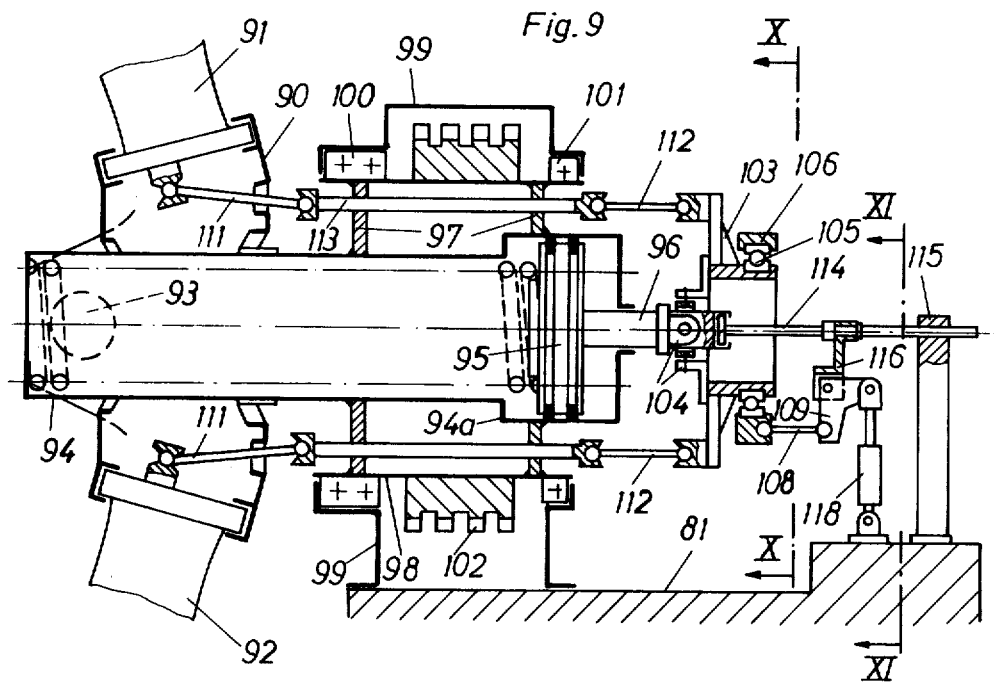
FIG. 9 is a longitudinal cross-sectional view of a fourth embodiment of a wing rotor, with other wing timing means.
Figure 10:
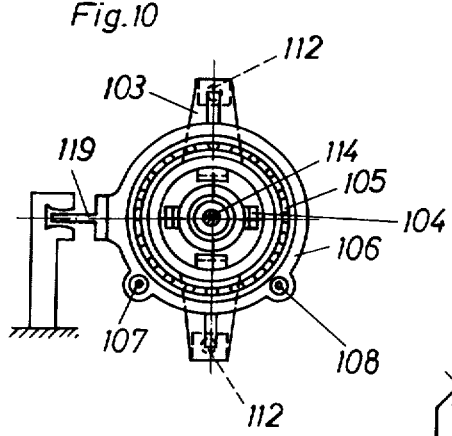
FIG. 10 is a cross-sectional view along line X—X of FIG. 9.
Figure 11:
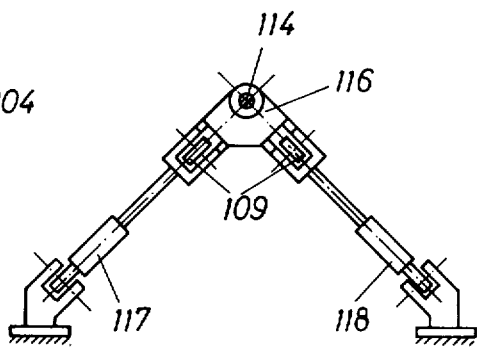
FIG. 11 is a cross-sectional view along line XI—XI of FIG. 9.

FIGS. 9-11 partially schematically show a fourth embodiment of a wind turbine according to the invention. It comprises a rotor hub 90, which supports two axially swivelable wing blades 91 and 92. Hub 90 is swivelably attached to a hollow shaft 94 by a simple single axis joint 93. The shaft 94 defines a cylinder 94a for receiving a control piston 95 that carries a control rod 96. Hollow shaft 94 is, in turn, attached concentrically to and is inside of and is radially spaced inwardly from another hollow shaft 98 by means of two disks 97 or equivalent spokes. Shaft 98 is rotatably carried in a gearbox case 99 that is supported on a bearing seat 81. There are bearings 100 and 101 for the case 99 and there is a side gear 102 in case 99. The case 99 can be rotated in the bearings and such rotation is caused by some means (not shown) engaging the gear 102. By means of such rotation, the shaft 94 and the elements 96–99 outside it may rotate along with the rotor and the below described connective elements 111, 112 and 113.

The fourth embodiment differs from the above described embodiments in that a guide rod support 103 is attached on piston rod 96 by cardan joint 104 which is located at the rotor shaft and away from wing rotor 90, 91, 92. Each wing blade 91, 92 is connected to the guide rod support 103 via a respective first guide 111, a connecting rod 113, which passes through disks 97, and via a second guide 112. All guides are equipped with universal swivel ball head joints.

On guide rod support 103, there is an annular roller bearing 105 for supporting a ring 106. Ring 106 is prevented from rotating under torque forces by a support 119 (FIG. 10). Thus, ring 106 does not rotate with rotor shaft 94 or with guide rod support 103. There are control rods 107, 108, which are attached to ring 106 by means of two ball-and-socket joints. These rods are offset from each other by 90°. Each rod 107, 108 is connected to a respective hydraulic cylinder 117 and 118 via a respective toggle lever 109. The hydraulic cylinders in turn are anchored to bearing seat 81. For supporting the toggle levers 109, there is attached at the end of piston rod 96 an extension rod 114. Rod 114 does not rotate with the piston rod, but merely follows the motions in an axial direction of rod 96. Rod 114 freely shifts axially with respect to its support 115. A bearing flange 116 is rigidly attached on the extension rod 114 and that flange has two 90° offset bearings for supporting both toggle levers 109.

The toggle levers 109 permit both hydraulic cylinders 117 and 118 to be arranged so that their axes extend in a radial direction relative to the rotor rotational axis. This arrangement ensures that the hydraulic cylinders do not block parts 95, 96, 103 through 109, and 111 through 114 from moving in an axial direction, e.g., upon the timing motion of the wing blades 91 and 92 for rpm control.

Hydraulic cylinders 117 and 118 operate as follows. Referring to FIG. 9, when both hydraulic cylinders execute the same length piston stroke simultaneously, then ring 106 and guide rod support 103 is swiveled around a horizontal axis like the one at joint 104. This correspondingly moves the rods 111, 112, 113 and thereby produces a simultaneous twisting torque of both wing blades 91 and 92 by the same amount and in the same blade pitch direction. With a rotating wing rotor, this means that the pitch of both wing blades at their vertical position is changed by said amount (+m and/or −m in FIG. 8) relative to their pitch at their horizontal position. The magnitude of the piston stroke and thereby the value of m can be determined, as in FIG. 7, by a control device as a function of applicably effective transverse force Q, again for the purpose of minimizing the force Q.

In the above described case, the phase shift (p in FIG. 8) would be zero. To have a phase shift, the control device must cause both hydraulic cylinders 117 and 118 to execute piston strokes that differ from each other so that guide rod support 103 is additionally swiveled around a horizontal axis under a different cycle turning arrangement. Exactly as the control device changes the amplitude m of cyclic wing timing according to the present transverse force Q, so also the phase shift p can be changed each moment according to the applicable direction of transverse force Q. A sensing and control device arrangement (not shown) like elements 75, 77 in FIG. 7 controls the length and timing of the strokes of the pistons of cylinders 117 and 118 to adjust blade pitch and overcome the transverse force.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

What is claimed is:

1. A wind turbine, including an axial flow through wing rotor; said rotor comprising a rotor hub and at least one wing blade having a pitch with respect to the wind flow so as to be adapted to rotate with said hub in the wind flow, said wing blade being supported by said hub and projecting therefrom; a rotor shaft; said hub being supported on said rotor shaft and being connected thereto such that rotation of said rotor rotates said rotor shaft;

a bearing seat for carrying said rotor shaft for rotation in said bearing seat; said seat being rotatable around an axis which extends substantially vertically for turning said rotor into the wind; each said wing blade being inclined relative to the general plane of rotation of said rotor;

means for enabling said rotor, which is comprised of said hub and said wing blade, to deflect under the effect of a transverse force acting on said rotor across the wind direction, which transverse force is the resultant of various wind velocities at various regions of the plane of revolution of said rotor, and said deflection of said rotor initiating a reduction of the transverse force acting on said rotor.

2. The wind turbine of claim 1, wherein said rotor includes two said wing blades spaced apart around said hub.

3. The wind turbine of claim 2, wherein the deflection of said rotor moves said wing blades with respect to the wind flow in the wind direction and thus shifts said wing blades to a new orientation but one at which said wing blades need not swivel with respect to said hub around each revolution of said rotor, while the pitch of each said wing blade with respect to the wind flow varies due to said deflection around each revolution of said rotor, for reducing the transverse force.

4. The wind turbine of claim 3, further comprising each said wing blade being swivelably mounted to said hub for swiveling about the longitudinal axis of each said wing blade with respect to said hub; means for swiveling each said blade about its said longitudinal axis with respect to said hub for controlling the pitch of each said blade and thus the rate of revolution of said rotor.

5. The wind turbine of claim 3, wherein said rotor is swivelably connected with said rotor shaft for being able to swivel with respect to said rotor shaft; said rotor is supported on said rotor shaft such that said deflection of said rotor consists of free swiveling of said rotor around a swivel axis passing through each said wing blade at a first distance from said hub and intersecting the axis of said rotor shaft; said wing blade being shaped such that the wind flow in the wind direction applies force to said wing blade at a resultant location that is a further distance along said wing blades than said first distance therealong.

6. The wind turbine of claim 5, further comprising an articulated joint swivelably connecting said rotor to said rotor shaft for permitting said rotor to swivel in any direction with respect to said rotor shaft; the center of the swivel motion lying in the center of gravity of said rotor.

7. The wind turbine of claim 6, further comprising each said wing blade being swivelably mounted to said hub for swiveling about the longitudinal axis of each said wing blade with respect to said hub; means for swiveling each said blade with respect to said hub for controlling the timing of said rotor.

8. The wind turbine of claim 2, further comprising an articulated joint swivelably connecting said rotor to said rotor shaft for permitting said rotor to swivel in any direction with respect to said rotor shaft.

9. The wind turbine of claim 5, further comprising two booster masses affixed on said rotor at opposite locations thereon and offset 90° relative to said wing blades.

10. The wind turbine of claim 5, further comprising booster masses on each said wing blade.

11. The wind turbine of claim 5, wherein each said wing blade has a longitudinal axis that is placed such that it passes by said rotor rotational axis and said longitudinal axis also being spaced from that said rotor rotational axis the same distance and said wing blade longitudinal axes being symmetrically located around said rotor rotational axis.

12. The wind turbine of claim 2, further comprising a measuring device for measuring the transverse force and a control device connected with said measuring device for varying the pitch of each said wing blade with respect to the wind flow for reducing the transverse force.

13. The wind turbine of claim 12, wherein the pitch of each said wing blade varies around each revolution of said rotor for reducing the transverse force.

14. The wind turbine of claim 13, further comprising each said wing blade being swivelably mounted to said hub for swiveling about the longitudinal axis of each said wing blade with respect to said hub; means for swiveling each said blade with respect to said hub for controlling the timing of said rotor.

15. The wind turbine of claim 14, wherein said means for swiveling each said blade comprises a yoke like guide rod support connected to and swivelable by said control device; a respective guide rod between said guide rod support and the respective said blade; a swivelable timing pin on each said blade and to which the respective said guide rod is connected, whereby as said guide rod support is swiveled, it operates said guide rods and swivels said blades so that the pitch angles of said blades with respect to the wind direction during a revolution of said rotor can be cyclically varied.

16. The wind turbine of claim 15, further comprising an additional means between said control device and said guide rod support for swiveling said guide rod support around an axis transverse to the rotational axis of said rotor and said guide rod support, thereby to adjust the pitch of said blades.

17. The wind turbine of claim 15, wherein said guide rod support supports a ring thereon adapted not to rotate with rotation of said guide rod support; a swiveling device connected with said ring for swiveling said ring around an axis transverse to the rotational axis of said guide rod support, for adjusting the pitch of said blades.

18. The wind turbine of claim 17, further comprising a universal joint connection between said guide rod support and said rotor, thereby permitting the swiveling motion of said ring and said guide rod support.

19. The wind turbine of claim 18, wherein said swiveling device comprises two mutually approximately 90° offset shifting devices which are connected to said ring for moving said ring as each said shifting device is shifted.

20. The wind turbine of claim 12, further comprising a respective mechanical connection between each said blade and said control device for independently changing the pitch of each said blade with respect to the wind direction in response to the transverse force.

21. The wind turbine of claim 20, wherein each said mechanical connection comprises a hydraulic cylinder having one element thereof connected with the respective said blade and having the other element thereof connected with said control device.

22. The wind turbine of claim 12, wherein said bearing seat is movably arranged for moving at least in one direction across the wind direction under the effect of said transverse force; said measuring device measuring transverse force at least in part by measuring the crosswise motion of said bearing seat.

23. The wind turbine of claim 22, further comprising an elastically deformable tower and said bearing seat being carried on said tower; said measuring device measuring said crosswise motion of said bearing seat by measuring deformation of said tower under transverse force.

24. The wind turbine of claim 12, further comprising an indicator device for continuously monitoring the momentary rotary position of said rotor shaft and another indicator device for monitoring the positions of said wing blades as said wing blades rotate and said control device being connected to said indicator devices for receiving therefrom information as to the positions of said rotor shaft and said wing blades and for adjusting the pitch of said blades in response thereto.

25. The wind turbine of claim 5, further comprising a yoke like guide rod support which is connected with said rotor for rotating therewith; a respective guide rod between said guide rod support and each said blade; linkage points arranged on said guide rod support for joining said guide rods thereto, such that deflection of said rotor under influence of wind triggers an additional timing adjustment of said blade through said guide rod support for reducing the transverse force.

26. A wind turbine, including an axial flow through winged rotor; said rotor comprising a rotor hub and at least one wing blade having a pitch with respect to the wind flow so as to be adapted to rotate with said hub in the wind flow; said wind blade being supported by said hub and projecting therefrom;

a rotor shaft having a rotation axis; said hub being supported on said rotor shaft and being connected thereto such that rotation of said rotor, including said hub thereof, rotates said rotor shaft; said connection of said hub with said rotor shaft being a free swivel connection for enabling said rotor to swivel with respect to said rotor shaft;

said wing blade being inclined to the general plane of rotation of said rotor; said wing blade having a center of gravity thereof out along said wing blade from said hub; a swivel axis for said wing blade passing through said swivel connection and through said center of gravity of said wing blade as said wing blade crosses said swivel axis, and said swivel axis intersecting said rotation axis of said rotor shaft; said wing blade being shaped and having a respective said pitch and being positioned with respect to said hub and said swivel axis such that the wind flow in the wind direction applies force to said wing blade at a resultant location that is a further distance along said wing blade than said center of gravity;

said hub being swivelable about said swivel axis and with respect to said rotor shaft so as to enable said rotor to deflect about said swivel axis under the effect of a transverse force acting upon said rotor at said resultant location and across the wind direction, which transverse force is the resultant of various wind velocities at various regions of the plane of rotation of said rotor, and said deflection of said rotor initiates a pitch variation of said wing blade with respect to the wind flow and said pitch variation occurs around each revolution of said rotor, and said pitch variation reduces the transverse force acting upon said rotor at said resultant location on said wing blade; and a bearing seat for carrying said rotor shaft for rotation in said bearing seat; said bearing seat being rotatable around an axis which extends substantially vertical for enabling turning of said rotor into the wind.

27. The wind turbine of claim 26, wherein said inclination of said wing blade moving outwardly of said hub, is downstream in the wind direction and said swivel axis is downstream in the wind direction of the connection between said wing blade and said hub.

28. The wind turbine of claim 26, further comprising said wing blade being swivelably mounted to said hub for swiveling about the longitudinal axis of said wing blade with respect to said hub; means for swiveling said wing blade with respect to said hub for controlling said pitch of said wing blade and thus the rate of revolution of said rotor.

29. The wind turbine of claim 26, wherein said swivel connection between said hub and said rotor shaft comprises an articulated joint swivelably connecting said hub to said rotor shaft for permitting said rotor to swivel in any direction with respect to said rotor shaft, and thus for permitting said rotor to swivel about said swivel axis.

30. A wind turbine, including an axial flow through winged rotor; said rotor comprising a rotor hub and at least two wing blades spaced apart around said hub being supported by said hub and projecting therefrom; each said wing blade having a pitch with respect to the wind flow so as to be adapted to rotate with said hub in the wind flow;

a rotor shaft having a rotation axis; said hub being supported on said rotor shaft and being connected thereto such that rotation of said rotor, including said hub thereof, rotates said rotor shaft; said connection of said hub with said rotor shaft being a free swivel connection for enabling said rotor to swivel with respect to said rotor shaft;

said wing blades each being inclined in the same direction to the general plane of rotation of said rotor; each said wing blade having a center of gravity out along said wing blade from said hub; a swivel axis for all said wing blades and passing through said swivel connection and passing through said center of gravity of each said wing blade as said wing blade crosses said swivel axis, and said swivel axis intersecting said rotation axis of said rotor shaft; said wing blades being shaped and having a respective said pitch and being positioned with respect to said hub and said swivel axis such that the wind flow in the wind direction applies force to each said wing blade at a resultant location therealong that is a further distance along the said wing blade than its respective center of gravity;

said hub being swivelable about said swivel axis and with respect to said rotor shaft so as to enable said rotor to deflect about said swivel axis under the effect of a transverse force acting upon said rotor at said resultant locations and across the wind direction, which transverse force is the resultant of various wind velocities at various regions of the plane of rotation of said rotor, and said deflection of said rotor initiates a pitch variation of said wing blades with respect to the wind flow and said pitch variation of each said wing blade occurs around each revolution of said rotor, and said pitch variation reduces the transverse force acting upon said rotor at said resultant locations on said wing blades; and a bearing seat for carrying said rotor shaft for rotation in said bearing seat; said bearing seat being rotatable around an axis which extends substantially vertical for enabling turning of said rotor into the wind.

31. The wing turbine of claim 30, wherein said inclination of said wing blades moving outwardly of said hub, is downstream in the wind direction and said swivel axis is downstream in the wind direction of the connection between said wing blades and said hub.

32. The wind turbine of claim 30, further comprising each said wing blade being respectively swivelably mounted to said hub for swiveling about the respective longitudinal axis of each said wing blade with respect to said hub; means for swiveling each said wing blade with respect to said hub for controlling said pitch of each said wing blade and thus the rate of revolution of said rotor.

33. The wind turbine of claim 30, wherein said swivel connection between said hub and said rotor shaft comprises an articulated joint swivelably connecting said hub to said rotor shaft for permitting said rotor to swivel in any direction with respect to said rotor shaft, and thus for permitting said rotor to swivel about said swivel axis.

34. The wind turbine of claim 31, further comprising each said wing blade being respectively swivelably mounted to said hub for swiveling about the respective longitudinal axis of each said wing blade with respect to said hub; means for swiveling each said wing blade with respect to said hub for controlling said pitch of each said wing blade and thus the rate of revolution of said rotor.

35. The wind turbine of claim 31, wherein said swivel connection between said hub and said rotor shaft comprises an articulated joint swivelably connecting said hub to said rotor shaft for permitting said rotor to swivel in any direction with respect to said rotor shaft, and thus for permitting said rotor to swivel about said swivel axis.

36. The wind turbine of claim 31, wherein said swivel connection between said hub and said rotor shaft comprises a cardan type swivel joint including a plurality of swiveling axes and said swivel axis being one of said swivel axes of said cardan joint; said connection of said hub and said rotor shaft being upstream in the wind flow from said swivel axis.

* * * * *